(12) United States Patent
Mirto et al.

(10) Patent No.: US 9,242,420 B2
(45) Date of Patent: Jan. 26, 2016

(54) PROCESS AND PLANT FOR PRODUCING TYRES FOR VEHICLE WHEELS

(75) Inventors: Antonio Mirto, Milan (IT); Stefano Sangiovanni, Milan (IT); Guido Montacchini, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 808 days.

(21) Appl. No.: 12/312,437

(22) PCT Filed: Nov. 27, 2006

(86) PCT No.: PCT/IB2006/004036
§ 371 (c)(1),
(2), (4) Date: May 11, 2009

(87) PCT Pub. No.: WO2008/065475
PCT Pub. Date: Jun. 5, 2008

(65) Prior Publication Data
US 2010/0243129 A1 Sep. 30, 2010

(51) Int. Cl.
*B29D 30/10* (2006.01)
*B29D 30/00* (2006.01)
*B29D 30/06* (2006.01)

(52) U.S. Cl.
CPC .............. *B29D 30/005* (2013.01); *B29D 30/10* (2013.01); *B29D 30/0661* (2013.01); *B29D 2030/105* (2013.01)

(58) Field of Classification Search
CPC .. B29D 30/005; B29D 30/0661; B29D 30/10; B29D 2030/105
USPC .......................................... 156/111, 133, 396
See application file for complete search history.

(56) References Cited

U.S. PATENT DOCUMENTS

| | | | |
|---|---|---|---|
| 4,773,810 A * | 9/1988 | Nishimura et al. | ...... 414/331.11 |
| 4,993,906 A | 2/1991 | Nisimura et al. | |
| 5,631,028 A | 5/1997 | Mizokawa et al. | |
| 5,928,675 A | 7/1999 | Irie | |
| 6,143,110 A * | 11/2000 | Laurent | .......................... 156/111 |
| 6,223,881 B1 * | 5/2001 | Carle | .......................... 198/347.3 |

(Continued)

FOREIGN PATENT DOCUMENTS

| | | |
|---|---|---|
| EP | 0 754 530 A2 | 1/1997 |
| WO | WO 01/32409 A1 | 5/2001 |

(Continued)

*Primary Examiner* — Martin Rogers
(74) *Attorney, Agent, or Firm* — Finnegan, Henderson, Farabow, Garrett & Dunner, L.L.P.

(57) ABSTRACT

A plant and a process for producing tires wherein the process includes the steps of: a) building a green tire on a toroidal support in a building line of a tire production plant; b) transferring the green tire and the relevant toroidal support from the building line of the production plant to a first holding unit; c) transferring the green tire and the relevant toroidal support from the first holding unit to a vulcanization line of the production plant; d) molding and vulcanization the green tire in the vulcanization line of the production plant; e) separating the molded and vulcanized tire from the relevant toroidal support; f) transferring the toroidal support, separated from the relevant tire, from the vulcanization line to the first holding unit; and g) transferring the toroidal support, separated from the relevant tire, from the first holding unit to the building line of the production plant, wherein steps b) and g) are carried out through a first transfer device and steps c) and f) are carried out through a second transfer device different from the first transfer device.

8 Claims, 5 Drawing Sheets

(56) References Cited

U.S. PATENT DOCUMENTS

2002/0174939 A1* 11/2002 Caretta et al. ............. 156/118
2003/0135972 A1* 7/2003 Scarzello ................... 29/426.1
2005/0133149 A1* 6/2005 Sieverding et al. ........ 156/130.5
2005/0194101 A1 9/2005 Caretta et al.

FOREIGN PATENT DOCUMENTS

| WO | WO 01/39963 A1 | 6/2001 | | |
|----|----|----|----|----|
| WO | WO 01/62481 A1 | 8/2001 | | |
| WO | WO 03/053662 | * | 7/2003 | ............ B29D 30/10 |
| WO | WO 2004/045837 A1 | 6/2004 | | |

* cited by examiner

PROCESS AND PLANT FOR PRODUCING TYRES FOR VEHICLE WHEELS

CROSS REFERENCE TO RELATED APPLICATION

This application is a national phase application based on PCT/IB2006/004036, filed Nov. 27, 2006, the content of which is incorporated herein by reference.

BACKGROUND OF THE INVENTION

1. Field of the Invention

The present invention relates to a process for producing tyres for vehicle wheels.

In particular, the present invention relates to a process for producing tyres built on a toroidal support.

Another object of the invention is a plant for producing tyres for vehicle wheels, able to be used to carry out the aforementioned producing process.

2. Description of the Related Art

The production cycles of a tyre provide that, after a building process in which the various components of the same tyre are made and/or assembled in a building line, a vulcanization and moulding process is carried out, in a suitable vulcanization line, adapted for defining the structure of the tyre according to a desired geometry and tread pattern.

A tyre generally comprises a toroidally ring-shaped carcass including one or more carcass plies, strengthened with reinforcing cords, lying in substantially radial planes, (a radial plane contains the rotation axis of the tyre). Each carcass ply has its ends integrally associated with at least one metal reinforcing annular structure, usually known as bead core, constituting the reinforcing at the beads, i.e. at the radially internal ends of the tyre, the function of which is to enable assembling of the tyre with a corresponding mounting rim. Placed crown wise to said carcass is a band of elastomer material, called tread band, in which, at the end of the vulcanization and molding steps, a raised pattern is formed for ground contact. A reinforcing structure usually known as belt structure is placed between the carcass and the tread band. In the case of car tyres, this structure usually comprises at least two radially superposed strips of rubberised fabric provided with reinforcing cords, generally of metal material, positioned parallel to each other in each strip and in a crossed relationship with the cords of the adjacent strip preferably symmetrically arranged with respect to the equatorial plane of the tyre. Preferably said belt structure further comprises at a radially external position thereof, at least on the ends of the underlying belt strips, also a third layer of textile or metallic cords, circumferentially disposed (at zero degrees).

Finally, in tyres of the tubeless type, i.e. devoid of an air tube, a radially internal layer, called liner, is present which has imperviousness features to ensure the air-tightness of the tyre.

To the aims of the present description as well as in the following claims, by the term "elastomer material" it is intended a composition comprising at least one elastomer polymer and at least one reinforcing filler. Preferably this composition further comprises additives such as cross-linking and/or plasticizing agents. By virtue of the cross-linking agents, this material can be cross-linked through heating so as to form the final manufactured article.

In recent times tyre production processes in which a green tyre is built on a rigid toroidal support has been introduced in the field. Said processes are preferably used for tyres produced starting from a limited number of elementary semifinished products fed onto a toroidal support whose outer profile coincides with that of the radially internal surface of the tyre that is wished to be produced. The toroidal support is moved, preferably by means of a robotized system, among a plurality of working stations in each of which, through automated sequences, a particular building step of the tyre is carried out. At the end of the building steps, the toroidal support with the tyre supported thereby is arranged inside a vulcanization mould.

In the present context, by the term "green tyre" a tyre obtained by the building process is indicated.

An example of the aforementioned processes is described in WO 01/32409, in the name of the same Applicant, which illustrates a tyre building line provided with working stations, each arranged to make and assemble at least one structural component of the tyre being processed, in which at least one series of tyres comprising at least a first and a second tyre model that are different from each other is treated simultaneously, and in which the transferral of the tyres to the vulcanization line is carried out through robotized arms and according to a transferring rate which is equal to the transferring rate of the tyres to each of said working stations.

WO 01/39963, in the name of the same Applicant, on the other hand, illustrates a process for producing tyres that are different from each other, comprising a building unit having a plurality of working stations, each adapted for assembling at least one structural component on at least one type of tyre being processed, a vulcanization unit, and a device for transferring and moving the tyre being processed, operating between the working stations and the vulcanization unit.

Said device for transferring and moving the tyre transfers a green tyre to the vulcanization unit; after vulcanization, it picks up a vulcanized and moulded tyre from the vulcanization unit and transfers it to the first working station of the building unit, where the tyre is removed from the corresponding toroidal support. The latter is then transferred from the same device for transferring and moving the tyre into a temperature stabilizing device. In the case in which the tyre to be produced requires a different type of toroidal support, the device picks up the suitable toroidal support from a feeding station and inserts it into the temperature stabilizing device.

The Applicant has noted that since the aforementioned device for transferring and moving the tyre is arranged to carry out numerous operations and to make large displacements, requires large maneuvering spaces and therefore a plant of considerable size. In particular WO 01/39963 describes the use of a robotized arm translating on a rail, as a device for transferring and moving the tyre.

The Applicant has also verified that, in such known processes, any anomaly or malfunctioning in any one from the vulcanization unit, mounting/dismounting unit of the toroidal supports, and temperature stabilizing unit, has the immediate consequence of blocking the production plant with serious repercussions on its productivity.

For example, in the case of blocking of the mounting/dismounting unit of the toroidal support, the device for transferring and moving the tyre does not carry out the removal of the tyre from the vulcanizer, even if the vulcanization has been completed. Consequently, the tyre obtained becomes overvulcanized and therefore is not in accordance with the required specifications.

SUMMARY OF THE INVENTION

The Applicant has observed that by equally distributing the duties of the active transfer devices between the building line and the vulcanization line, it is possible to obtain a more flexible process for producing tyres, in which possible anomalies or malfunctions do not affect productivity.

The Applicant has thus realised that by rationalising the workload of the devices adapted for transferring the toroidal supports between the building line and the vulcanization line, and within the two lines themselves, it is possible to absorb said anomalies or malfunctions without consequences on the rest of the plant.

The Applicant has therefore found that by suitably managing said transfer devices, both in terms of the number and the type of operations that each of them has to carry out, it is possible to obtain a process for producing tyres that allows to avoid wastes in case of failure, slowing down of the same producing process, as well as to reduce the size of the same production plant.

In accordance with a first aspect thereof, the invention concerns a process for producing tyres for vehicle wheels comprising the steps of:

a) building a green tyre on a toroidal support in a building line of a tyre production plant;
b) transferring the green tyre and the relevant toroidal support from the building line of the production plant to a first holding unit;
c) transferring the green tyre and the relevant toroidal support from the first holding unit to a vulcanization line of the production plant;
d) moulding and vulcanizing the green tyre in the vulcanization line of the production plant;
e) separating the moulded and vulcanized tyre from the relevant toroidal support;
f) transferring the toroidal support, separated from the relevant tyre, from the vulcanization line to the first holding unit;
g) transferring said toroidal support, separated from the relevant tyre, from the first holding unit to the building line of the production plant;
in which said steps b) and g) are carried out through a first transfer device and said steps c) and f) are carried out through a second transfer device different from said first transfer device.

According to a preferred embodiment, said step c) of transferring the green tyre and the relevant toroidal support from the first holding unit to the vulcanization line of the production plant comprises step c1) of transferring the green tyre and the relevant toroidal support from the first holding unit to at least one vulcanization unit of the vulcanization line of the production plant through the second transfer device.

Advantageously, the process for producing tyres for vehicle wheels also comprises step f1) of transferring the moulded and vulcanized tyre and the relevant toroidal support from the vulcanization unit to an mounting/dismounting unit of the vulcanization line through said second transfer device.

Preferably, in this case, said step f) of transferring the toroidal support, separated from the relevant tyre, from the vulcanization line to the first holding unit comprises step f2) of transferring the toroidal support, separated from the relevant tyre, from the mounting/dismounting unit of the vulcanization line to the first holding unit through said second transfer device.

Preferably, said step g) of transferring the toroidal support, separated from the relevant tyre, from the first holding unit to the building line comprises step g1) of transferring the toroidal support, separated from the relevant tyre, from the first holding unit to a cooling unit of the building line through said first transfer device.

Advantageously, said step g) also comprises step g2) of transferring the toroidal support, separated from the relevant tyre, from the first holding unit to a working station of the building line of the production plant through said first transfer device.

Advantageously, said step f1) of transferring the moulded tyre and vulcanized and the relevant toroidal support from the vulcanization unit to the mounting/dismounting unit comprises the substeps of:

f1') transferring the moulded and vulcanized tyre and the relevant toroidal support from the vulcanization unit to the first holding unit; and
f1") transferring the moulded and vulcanized tyre and the relevant toroidal support from the first holding unit to the mounting/dismounting unit.

Preferably, said step b) of transferring the green tyre and the relevant toroidal support from the building line to the first holding unit comprises the substeps of:

b1) transferring the green tyre and the relevant toroidal support from the building line to a second holding unit; and
b2) transferring the green tyre and the relevant toroidal support from said second holding unit to the first holding unit.

Advantageously, said step g) of transferring the toroidal support, separated from the relevant tyre, from the first holding unit to the building line comprises the substeps of:

g') transferring the toroidal support, separated from the relevant tyre, from the first holding unit to a second holding unit; and
g") transferring the toroidal support, separated from the relevant tyre, from said second holding unit to the building line.

Preferably step g") comprises the step of transferring the toroidal support, separated from the relevant tyre, from the second holding unit to a working station of the building line.

The Applicant has also realised that it is possible to improve production by providing, before the moulding and vulcanization step, a pre-heating step of at least one mould of the corresponding vulcanization unit.

In accordance with a second aspect thereof, the invention concerns a plant for producing tyres for vehicle wheels comprising:

a building line of a green tyre on a respective toroidal support;
a vulcanization line of the tyre;
a first holding unit operatively arranged between said building line and said vulcanization line;
a first transfer device to transfer said toroidal support from said first holding unit to said building line and vice-versa;
a second transfer device to transfer said toroidal support from said first holding unit to said vulcanization line and vice-versa.

In the tyre production plant, according to a preferred embodiment, the building line of the green tyre comprises:

a plurality of working stations for building the green tyre; and
at least one cooling unit of a toroidal support, separated from the relevant tyre.

According to a further preferred embodiment, the vulcanization line of the tyre comprises:

at least one vulcanization unit of the tyre; and
at least one mounting/dismounting unit of a toroidal support.

Preferably, said first transfer device is adapted for:
transferring the green tyre and the respective toroidal support from the building line of the production plant to the first holding unit;
transferring the toroidal support, separated from the respective tyre, from the first holding unit to the cooling unit of the building line; and transferring the toroidal support, separated from the respective tyre, from the cooling unit of the building line to a working station of the building line.

According to a different preferred embodiment, the tyre production plant also comprises a second holding unit adapted for holding the green tyre and the relevant toroidal support coming out from the building line and for holding the toroidal support, separated from the relevant tyre, coming out from the vulcanization line.

In this case, said first transfer device is adapted for:
transferring the green tyre and the relevant toroidal support from said second holding unit to the first holding unit;
transferring the toroidal support, separated from the relevant tyre, from the first holding unit to the cooling unit of the building line of the production plant; and
transferring the toroidal support, separated from the respective tyre, from the cooling unit of the building line to the second holding unit.

Preferably, said second transfer device is adapted for:
transferring the green tyre and the relevant toroidal support from the first holding unit to at least one vulcanization unit of the vulcanization line of the production plant;
transferring the moulded and vulcanized tyre and the relevant toroidal support from the vulcanization unit to the mounting/dismounting unit of the vulcanization line of the production plant; and
transferring the toroidal support, separated from the relevant tyre, from the mounting/dismounting unit of the vulcanization line to the first holding unit.

The Applicant has also noted that it is possible to improve the productivity of the tyre production plant by providing a vulcanization line comprising two vulcanization units.

Even more preferably, each of said vulcanization units is provided with six vulcanization moulds. In this way, since the daily production required of a plant of the type described in the present context is equal to about 500 covers per day, it is possible to carry out 50 cycles per day and have 2 vulcanization moulds free for each cycle. Such free moulds can advantageously be used for mould changing operations, required by the vulcanization unit, and to pre-heat at least one mould inserted in the vulcanization unit.

In a variant of the present invention, the production plant comprises two mounting/dismounting units and/or four cooling units of the toroidal supports.

Advantageously, the production plant also comprises at least one rail on which at least one from said first transfer device and said second transfer device is movable.

In a preferred embodiment of the aforementioned production plant, said at least one rail extends between at least two units selected from the vulcanization unit, the mounting/dismounting unit, the cooling unit and the second holding unit and/or from a working station of the building line and a unit selected from the vulcanization unit, the mounting/dismounting unit, the cooling unit and the second holding unit.

Advantageously, at least one pair of rails constitute a track on which the first transfer device and the second transfer device run.

According to an embodiment of the present invention, the tyre production plant also comprising driving devices to move the first transfer device and the second transfer device along said at least one rail.

According to a preferred embodiment of the present invention, at least one from said first transfer device and said second transfer device is a robotized arm.

Advantageously, said first holding unit comprises at least two seats for housing the toroidal supports.

Preferably, the first holding unit comprises at least four seats for housing the toroidal supports.

According to an alternative embodiment of the present invention, said first holding unit is movable and, preferably, along said at least one rail.

In any case, it is possible to design that the first holding unit is preferably arranged on the track on which the first transfer device and the second transfer device run.

BRIEF DESCRIPTION OF THE DRAWINGS

Further characteristics and advantages of the invention shall become clear from the following description of some preferred examples of processes and plants for producing tyres according to the invention, made—for indicating and not limiting purposes—with reference to the attached drawings, in which.

DETAILED DESCRIPTION OF THE INVENTION

Figure 1:
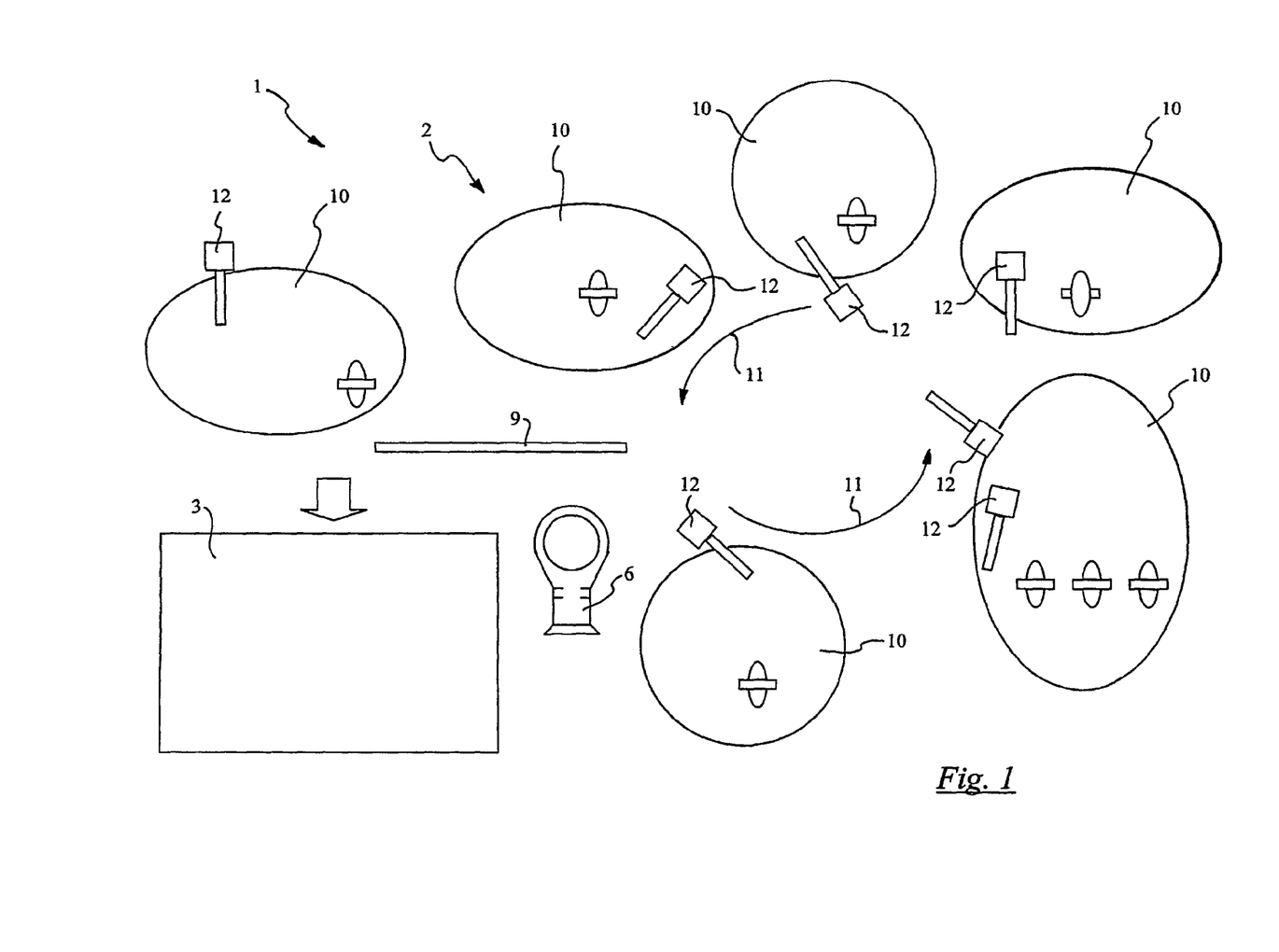
FIG. 1 shows a schematic lay-out of a plant for producing tyres for vehicle wheels in which the process according to the present invention is carried out.
Figure 2:
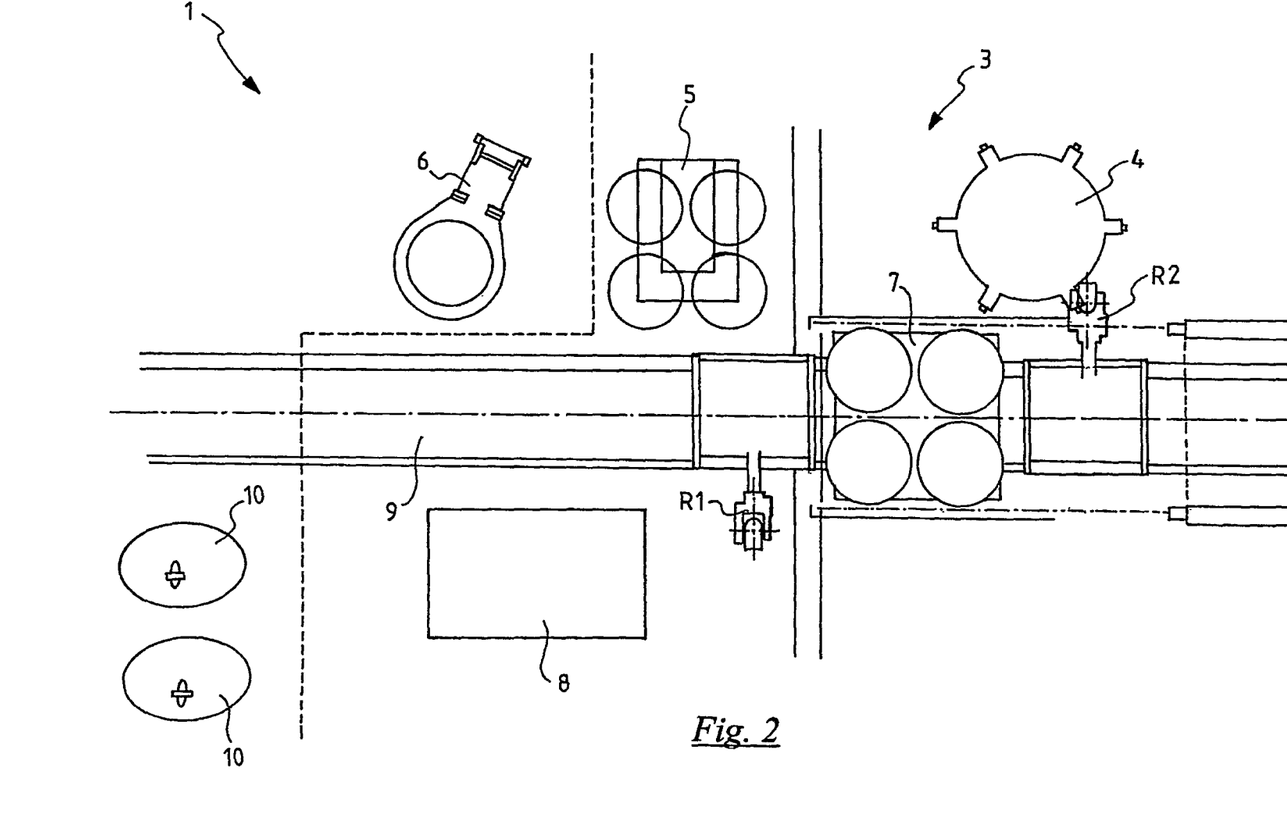
FIG. 2 shows a schematic plan view of a plant for producing tyres for vehicle wheels according to a first embodiment of the invention during a step of the subject process.
Figure 3:
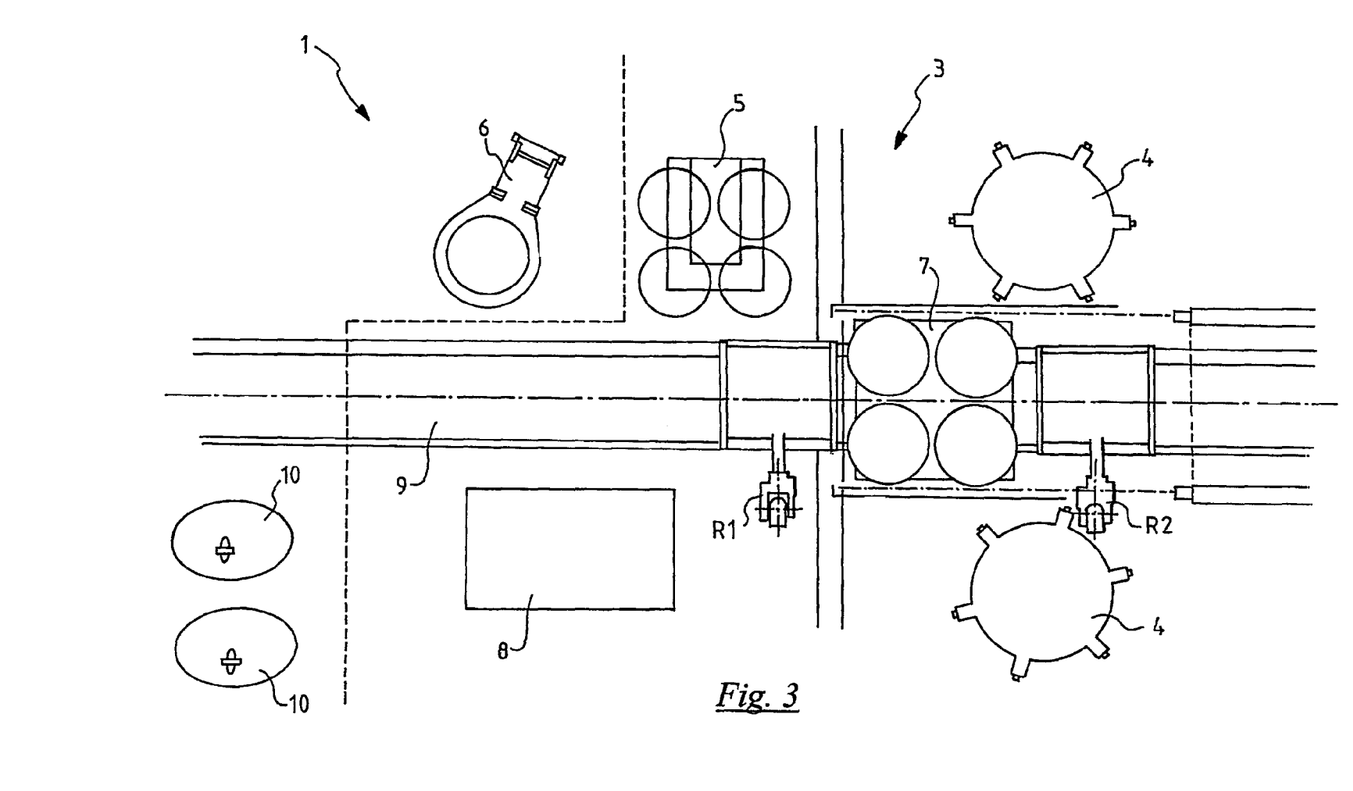
FIG. 3 shows a schematic plan view of a plant for producing tyres for vehicle wheels according to a second embodiment of the invention during a step of the subject process.

With reference to FIGS. 1-3 a plant for producing tyres for vehicle wheels according to the present invention through which the production process according to the present invention is carried out is generally indicated with 1.

The plant 1 comprises a building line 2, in which each tyre is built by assembling structural components according to a predetermined sequence, and a vulcanization line 3, in which each green tyre is moulded and vulcanized, within a respective vulcanization mould, thus transforming itself into the finished product.

The building line 2 comprises a plurality of working stations 10 preferably arranged along a closed loop path indicatively represented by the arrows 11 in FIG. 1.

Preferably, said working stations 10 operate simultaneously with each other, each on at least one tyre, to assemble at least one of its structural components thereon.

It should be noted that in the present description and in the subsequent claims by "structural component" of the tyre it is meant any component selected for example from: liner, sub-liner, carcass ply/plies, sub-belt insert, belt strips either crossing over one another or at zero degrees, attachment sheets for the tread band, tread band, rim, bead filler, textile or metallic reinforcement inserts, anti-abrasion insert, or any portion thereof.

In particular, during the assembly step the various structural components used in making each tyre are advantageously engaged on a toroidal support the shape of which substantially reproduces the internal configuration of the tyre to be obtained. Such a toroidal support is preferably of the type that is collapsible or dismountable into a plurality of sectors, as for example described in document WO 01/62481 to the Applicant, so as to be able to be easily removed from the tyre when processing is completed.

Transfer devices 12 operate in the building line 2 to transfer each of the tyres being processed associated with a respective toroidal support sequentially from one of the working stations 10 to the next working station, so as to determine the sequentially assembly of all the components of the tyre.

Preferably, such transfer devices 12 comprise one or more robotized arms associated with at least one of the working stations 10 and operating on the individual toroidal supports to carry out the transfer in sequence of each tyre being processed.

The building line 2 comprises, preferably, at least one cooling unit 6 of a toroidal support adapted for carrying a toroidal support coming out from the vulcanization line 3 at the suitable temperature to begin a new building process of a green tyre.

A first holding unit 7 of a toroidal support associated with or separated from a respective tyre being processed is operatively arranged between the building line 2 and the vulcanization line 3 of the production plant 1 so as to create a buffer between the two lines.

The production plant 1, according to the present invention, is also provided with a first transfer device R1, to transfer said toroidal support associated with or separated from a respective tyre being processed, between the first holding unit 7 and the building line 2, and with a second transfer device R2, to transfer said toroidal support between the first holding unit 7 and the vulcanization line 3.

Preferably at least one from said first transfer device R1 and said second transfer device R2 comprises a robotized arm.

Preferably, at least one from said first transfer device R1 and said second transfer device R2 is movable on at least one rail 9.

The vulcanization line 3 comprises at least one vulcanization unit 4 of the green tyre, and at least one mounting/dismounting unit 5 in which the vulcanized and moulded tyre is separated from the respective toroidal support.

In the first embodiment of the production plant 1, shown in FIG. 2, the vulcanization line 3 comprises a vulcanization unit 4 and an mounting/dismounting unit 5.

In the second embodiment of the production plant 1, shown in FIG. 3, the vulcanization line 3 comprises two vulcanization unit 4 and an mounting/dismounting unit 5.

Each vulcanization unit 4 comprises a number of vulcanization moulds adapted for the production capacities of the production plant 1. In particular, in the embodiments shown in FIGS. 2-5, each vulcanization unit 4 comprises six vulcanization moulds.

Preferably, the vulcanization moulds are mounted on a turntable to be driven in rotation so as to make the same vulcanization moulds carry out a closed-loop path, sequentially carrying them, one after the other, to a tyre loading/unloading station, each associated with its own toroidal support.

In this way, a green tyre, after having been loaded into a vulcanization mould, is subjected to a moulding and vulcanization process and, once the suitable time to complete the moulding and vulcanization operations has been achieved, is unloaded from the mould at the same loading/unloading station through rotation of the turntable.

The vulcanization moulds are preferably sealed airtight and are arranged to house a tyre being processed previously built on a toroidal support, the outer surface of which substantially reproduces the internal configuration of the tyre to be obtained. Said vulcanization moulds are provided with working fluid passage devices as illustrated for example in WO 2004/045837, in the name of the same Applicant.

The mounting/dismounting unit 5 is adapted for housing a vulcanized tyre and the respective toroidal support to perform the separation operation of the vulcanized tyre. In the present context, by the term "separation operation" it is meant to indicate at least all of the dismounting operations of the toroidal support, and the removal of the tyre from the aforementioned dismounted toroidal support.

In accordance with an embodiment of the present invention, the first transfer device R1 is adapted for:
  transferring the green tyre and the respective toroidal support from the building line 2 of the production plant 1 to the first holding unit 7;
  transferring the toroidal support, separated from the respective tyre, from the first holding unit 7 to the cooling unit 6 of the building line 2; and
  transferring the toroidal support, previously separated from the respective tyre, from the cooling unit 6 of the building line 2 to a working station 10 of the building line 2.

In accordance with the two embodiments shown in FIGS. 2 and 3, the production plant 1 also comprises a second holding unit 8 adapted for holding the green tyre and the relevant toroidal support coming out from the building line 2 and for holding the toroidal support, separated from the relevant tyre, coming out from the vulcanization line 3.

In this case, the tyre going into the vulcanization line 3 does not come directly from a station 10 of the building line, but transits through said second holding unit 8 and therefore, in this case, the first transfer device R1 is adapted for:
  transferring the green tyre and the relevant toroidal support from said second holding unit 8 to the first holding unit 7;
  transferring the toroidal support, separated from the relevant tyre, from the first holding unit 7 to the cooling unit 6 of the building line 2; and
  transferring the toroidal support, separated from the respective tyre, from the cooling unit 6 of the building line 2 to the second holding unit 8.

Independently from whether said second holding unit 8 is present, the second transfer device R2 is preferably adapted for:
  transferring the green tyre and the relevant toroidal support from the first holding unit 7 to a vulcanization unit 4 of the vulcanization line 3 of the production plant 1;
  transferring the moulded and vulcanized tyre and the relevant toroidal support from the vulcanization unit 4 to the mounting/dismounting unit 5 of the vulcanization line 3 of the production plant 1; and
  transferring the toroidal support, separated from the relevant tyre, from the mounting/dismounting unit 5 of the vulcanization line 3 to the first holding unit 7.

As illustrated above, said first and second transfer devices R1 and R2 can advantageously be movable on at least one rail 9. In the embodiment illustrated in FIGS. 2 and 3, at least one pair of rails 9 constitutes a track on which the aforementioned transfer devices R1 and R2 are capable of moving (in the case illustrated, by translating).

Advantageously, said rails 9 preferably extend between at least two units from the vulcanization unit 4, the mounting/dismounting unit 5, the cooling unit 6 and the second holding unit 8 and/or between a working station 10 of the building line 2 and at least one unit from the vulcanization unit 4, the mounting/dismounting unit 5, the cooling unit 6 and the second holding unit 8.

In the case in which the production plant 1 is provided with a second holding unit 8, said rails 9 also extend between the cooling unit 6 and said second holding unit 8.

Advantageously, the first holding unit 7 comprises at least two seats for housing the toroidal supports respectively associated with and/or separated from a green or moulded and vulcanized tyre.

According to the embodiments shown in FIGS. 2-5, said first holding unit 7 comprises four seats for housing the toroidal supports.

In such embodiments, the first holding unit 7 is arranged on the rail on which the first transfer device R1 and the second transfer device R2 run.

According to a variant of the present invention, the first holding unit 7 is movable so as to assist the transfer of the first transfer device R1 and of the second transfer device R2 simplifying their maneuvers and shortening the distances that they have to accomplish.

In this case, the first holding unit 7 is advantageously movable along said rails 9.

In accordance with an embodiment, the production plant 1 comprises driving devices to move the first transfer device R1 and the second transfer device R2 along said rails 9. Said driving devices can be associated with the rails 9 or else with the first transfer device R1 and with the second transfer device R2.

Where the productions requirements are such, it is possible to provide the vulcanization line 3 with two mounting/dismounting units 5 and/or the building line 2 with four cooling units 6.

With reference to the production plant 1 illustrated in FIGS. 1-5, a preferred embodiment of a production process according to the invention will now be described.

In accordance with a first step a), a green tyre is built on a respective toroidal support by assembling each structural component of the tyre according to a predetermined sequence at the aforementioned working stations 10 of the building line 2 of the production plant 1.

This building step of each tyre is carried out for example according to methods illustrated in document WO 01/32409, to the same Applicant.

When the building step is complete, the process for producing tyres according to the present invention provides carrying out a step b) transferring the green tyre and the relevant toroidal support from the building line 2 of the production plant 1 to the first holding unit 7. Such a step b) is carried out through the first transfer device R1.

The next step c) provides transferring the green tyre and the relevant toroidal support from the first holding unit 7 to the vulcanization line 3 through the second transfer device R2, different to the first transfer device R1.

Thereafter the green tyre is moulded and vulcanized in the vulcanization line 3 of the production plant 1 so as to define the structure of the tyre according to the desired geometry and tread pattern.

Once vulcanized and moulded, the tyre is separated from the relevant toroidal support in a step e) that comprises the dismounting of the toroidal support and the removal of the moulded and vulcanized tyre from said toroidal support. Preferably said step e) also comprises the subsequent remounting of the toroidal support, which is thus ready for another production cycle.

At this point the toroidal support, separated from the relevant tyre, is subjected to step f) of transferral from the vulcanization line 3 to the first holding unit 7 through the second transfer device R2.

Thereafter, the first transfer device R1 carries out step g) of transferring the toroidal support, from the first holding unit 7 to the building line 2 of the production plant 1.

Preferably, step c) of transferring the green tyre and the relevant toroidal support from the first holding unit 7 to the vulcanization line 3 of the production plant 1 comprises step c1) of transferring the green tyre and the relevant toroidal support from the first holding unit 7 to a vulcanization unit 4 of the vulcanization line 3 through the second transfer device R2.

Advantageously, the process according to the present invention, comprises the further step f1) of transferring the tyre, after it has been moulded and vulcanized, and the relevant toroidal support from the vulcanization unit 4 to the mounting/dismounting unit 5 of the vulcanization line 3 through said second transfer device R2.

In this case, said step f) of transferring the toroidal support, separated from the relevant tyre in the mounting/dismounting station 5, from the vulcanization line 3 to the first holding unit 7 comprises step f2) of transferring the toroidal support, after it has been separated from the relevant tyre, from the mounting/dismounting unit 5 of the vulcanization line 3 to the first holding unit 7 through said second transfer device R2.

Preferably, step g) of transferring the toroidal support separated from the relevant tyre from the first holding unit 7 to the building line 2 comprises step g1) of transferring the toroidal support from the first holding unit 7 to the cooling unit 6 through the first transfer device R1.

Said step g) also comprises a step g2) of transferring the toroidal support from said cooling unit 6 to a working station 10 of the building line 2 through the first transfer device R1.

According to an alternative embodiment of the process for producing tyres, step f1) of transferring the vulcanized and moulded tyre and the relevant toroidal support from the vulcanization unit 4 to the mounting/dismounting unit 5 comprises the substeps of:

f1') transferring the vulcanized and moulded tyre and the relevant toroidal support from the vulcanization unit 4 to the first holding unit 7; and f1") transferring the vulcanized and moulded tyre and the relevant toroidal support from the first holding unit 7 to the mounting/dismounting unit 5.

In other words, according to such an alternative embodiment, the toroidal support transits by the first holding unit 7 even after the vulcanization process, before the toroidal support has been dismounted and, after the removal of the vulcanized tyre, mounted again.

Preferably, step b) of transferring the green tyre and the relevant toroidal support from the building line 2 to the first holding unit 7 comprises the substeps of:

b1) transferring the green tyre and the relevant toroidal support from the building line 2 to a second holding unit 8; and b2) transferring the green tyre and the relevant toroidal support from said second holding unit 8 to the first holding unit 7.

In a similar manner, step g) of transferring the toroidal support, separated from the relevant tyre, from the first holding unit 7 to the building line 2 comprises the substeps of:

g') transferring the toroidal support from the cooling unit 6 to the second holding unit 8; and g") transferring the toroidal support from said second holding unit 8 to the building line 2.

Preferably step g") comprises the step of transferring the toroidal support from said second holding unit 8 to a working station 10 of the building line 2.

According to an embodiment, the process for producing tyres for vehicle wheels comprises, before step d) of moulding and vulcanizing the tyre in the vulcanization unit 4, a pre-heating step of a mould of the corresponding vulcanization unit 4.

Figure 4:
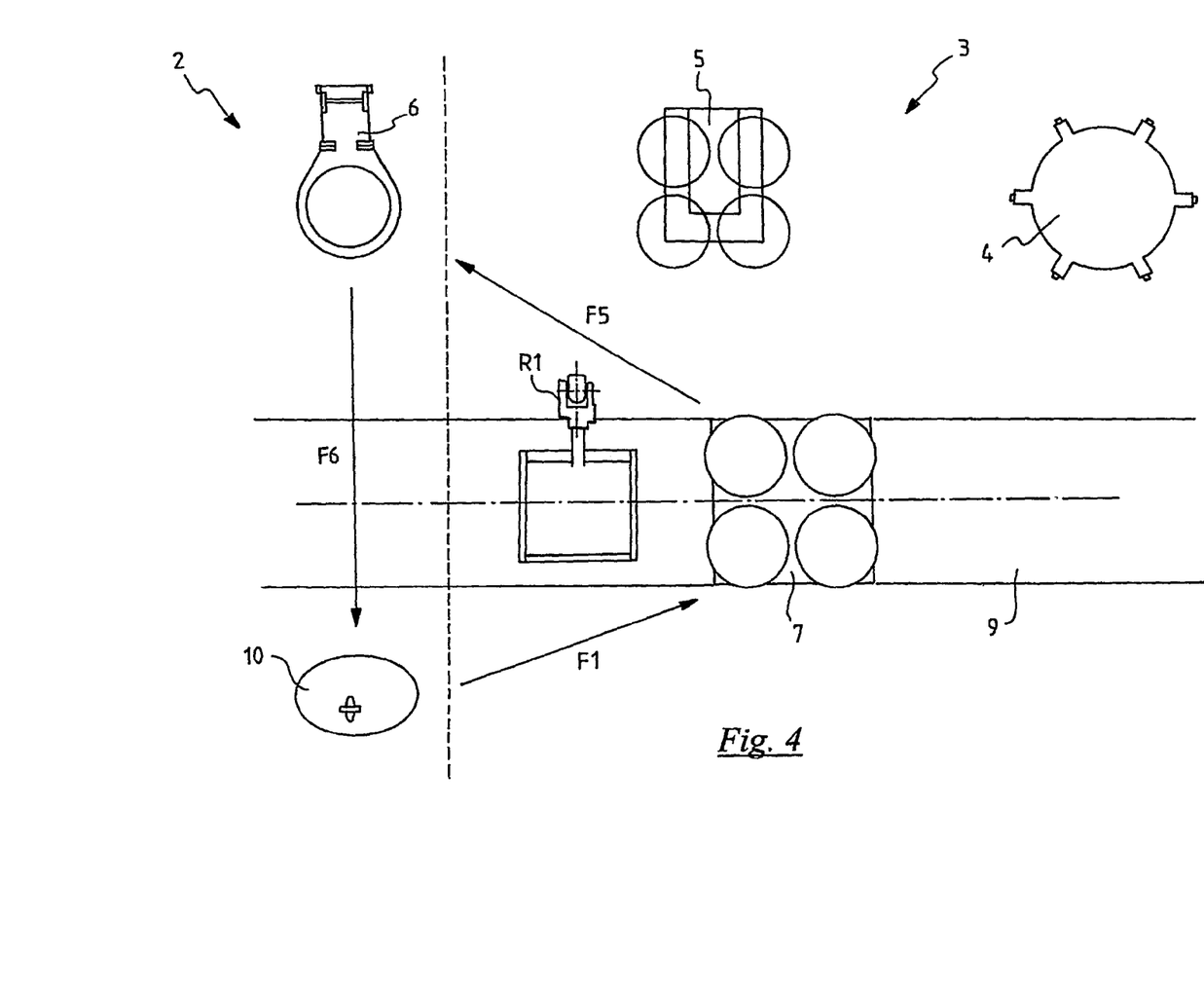
FIGS. 4 and 5 show two partial plan views of a plant for producing tyres for vehicle wheels.

FIG. 4 schematically shows the transferrals carried out by the first transfer device R1, in an embodiment of the present invention. Such transferrals are indicated by the arrows F1, F5 and F6.

Figure 5:
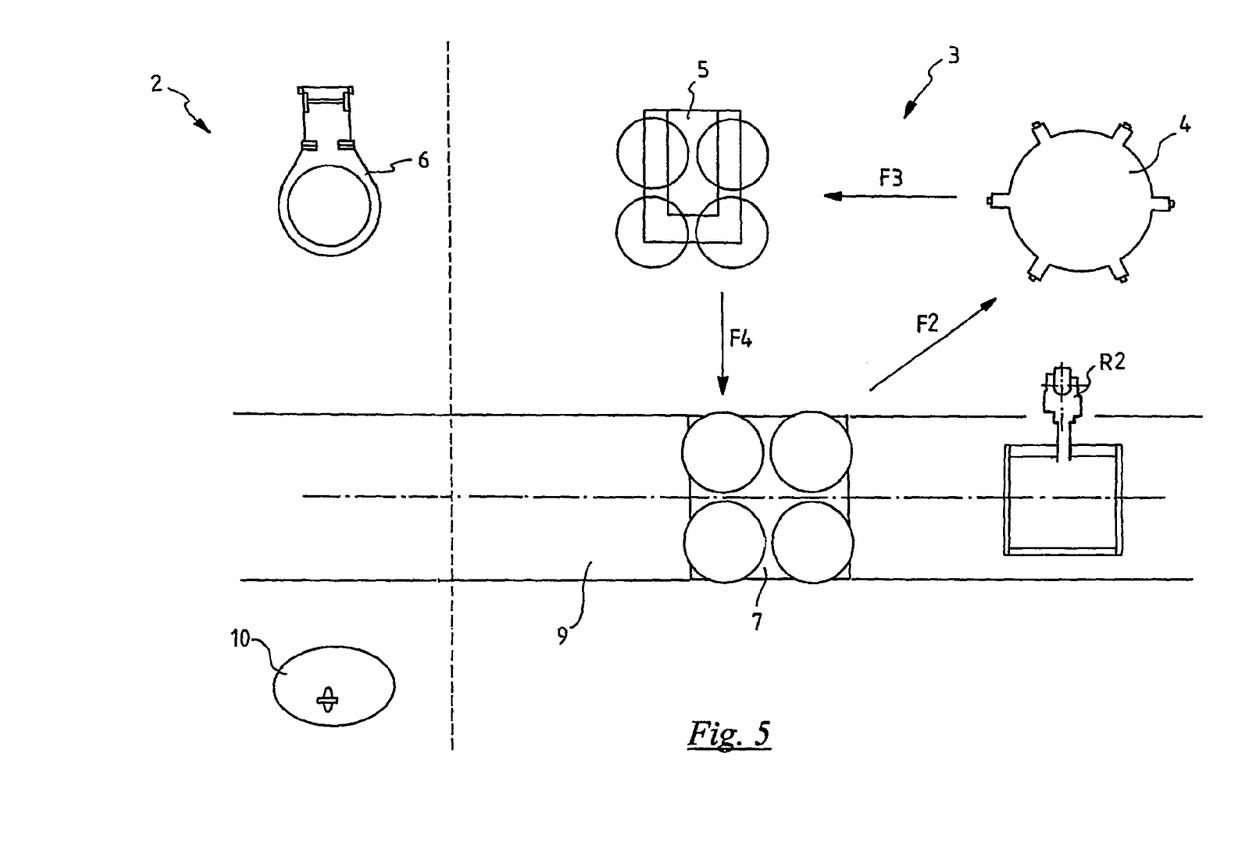

Similarly, FIG. 5 schematically shows the transferrals carried out by the second transfer device R2, in the same embodiment. These transferrals are indicated by the arrows F2, F3 and F4.

The steps of the production process according to the present invention have up to now been described in sequence from the building of the green tyre up to the vulcanized tyre leaving the production plant. However, the steps of the process occur simultaneously and the units such as the vulcanization unit 4, the mounting/dismounting unit 5, the cooling unit 6 and the second holding unit 8, operate simultaneously, each on at least one tyre to carry out the step of the production process on it for which it is intended.

In order to better understand the invention, with reference to FIGS. 4 and 5, it is possible to schematize the production process according to a possible embodiment of the present invention, in normal operating conditions, i.e. when the vulcanization unit 4 is full, as follows.

The second transfer device R2 in sequence carries out the steps of:
F3) transferring the moulded tyre and vulcanized and the relevant toroidal support from the vulcanization unit 4 to the mounting/dismounting unit 5;
F2) transferring the green tyre and the relevant toroidal support from the first holding unit 7 to a vulcanization unit 4;
F4) transferring the toroidal support, separated from the relevant tyre, from the mounting/dismounting unit 5 to the first holding unit 7.

At the same time, the first transfer device R1 in sequence carries out the steps of:
F1) transferring the green tyre and the relevant toroidal support from a station 10 of the building line 2 to the first holding unit 7;
F6) transferring the toroidal support, separated from the relevant tyre, from the cooling unit 6 to a working station 10 of the building line 2;
F5) transferring the toroidal support, separated from the relevant tyre, from the first holding unit 7 to the cooling unit 6.

Preferably, F1) and F2) are carried out simultaneously, just as F6) is carried out simultaneously to F4) and F5) is carried out simultaneously to F4.

The invention claimed is:

1. A process for producing tyres for vehicle wheels comprising the steps of:
a) building a green tyre on a toroidal support in a building line of a tyre production plant;
b) transferring the green tyre and the toroidal support from the building line of the production plant to a first holding unit;
c) transferring the green tyre and the toroidal support from the first holding unit to a vulcanization unit of a vulcanization line of the production plant;
d) moulding and vulcanizing the green tyre in the vulcanization line of the production plant;
e) separating the moulded and vulcanized tyre from the toroidal support;
f) transferring the toroidal support, separated from the vulcanized tyre, from the vulcanization line to the first holding unit; and
g) transferring said toroidal support, separated from the vulcanized tyre, from the first holding unit to the building line of the production plant;

wherein steps b) and g) are carried out through a first transfer device and steps c) and f) are carried out through a second transfer device different from said first transfer device, and wherein the process further comprises transferring the moulded and vulcanized tyre and the toroidal support from the vulcanization unit to a mounting/dismounting unit of the vulcanization line through said second transfer device, comprising:
transferring the moulded and vulcanized tyre and the toroidal support from the vulcanization unit to the first holding unit; and
transferring the moulded and vulcanized tyre and the toroidal support from the first holding unit to the mounting/dismounting unit.

2. The process for producing tyres for vehicle wheels according to claim 1, wherein step f) of transferring the toroidal support, separated from the vulcanized tyre, from the vulcanization line to the first holding unit comprises:
transferring the toroidal support, separated from the vulcanized tyre, from the mounting/dismounting unit of the vulcanization line to the first holding unit through said second transfer device.

3. The process for producing tyres for vehicle wheels according to claim 1, wherein step g) of transferring the toroidal support, separated from the vulcanized tyre, from the first holding unit to the building line comprises step:
g1) transferring the toroidal support, separated from the vulcanized tyre, from the first holding unit to a cooling unit of the building line through said first transfer device.

4. The process for producing tyres for vehicle wheels according to claim 1, wherein step g) of transferring the toroidal support, separated from the vulcanized tyre, from the first holding unit to the building line comprises step:
g2) transferring the toroidal support, separated from the vulcanized tyre, from the first holding unit to a working station of the building line of the production plant through said first transfer device.

5. The process for producing tyres for vehicle wheels according to claim 1, wherein step b) of transferring the green tyre and the toroidal support from the building line to the first holding unit comprises the substeps of:
b1) transferring the green tyre and the toroidal support from the building line to a second holding unit; and
b2) transferring the green tyre and the toroidal support from said second holding unit to the first holding unit.

6. The process for producing tyres for vehicle wheels according to claim 3, wherein step g) of transferring the toroidal support, separated from the vulcanized tyre, from the first holding unit to the building line comprises the substeps of:
g') transferring the toroidal support, separated from the vulcanized tyre, from the first holding unit to a second holding unit; and
g") transferring the toroidal support, separated from the vulcanized tyre, from said second holding unit to the building line.

7. The process for producing tyres for vehicle wheels according to claim 6, wherein step g") of transferring the toroidal support, separated from the vulcanized tyre, from said second holding unit to the building line comprises the step of transferring the toroidal support, separated from the vulcanized tyre, from the second holding unit to a working station of the building line.

8. The process for producing tyres for vehicle wheels according to claim 1, wherein step d) of moulding and vulcanizing the tyre in the vulcanization unit comprises a preheating step of a mould of the vulcanization unit.

\* \* \* \* \*